US011395146B2

(12) United States Patent
El Assaad et al.

(10) Patent No.: US 11,395,146 B2
(45) Date of Patent: Jul. 19, 2022

(54) APPARATUS, METHOD AND COMPUTER PROGRAM FOR DETERMINING INFORMATION RELATED TO AN AUTHENTICITY OF A WIRELESS MESSAGE IN A WIRELESS GROUP COMMUNICATION AMONG VEHICLES OF A GROUP OF VEHICLES

(71) Applicant: Volkswagen Aktiengesellschaft, Wolfsburg (DE)

(72) Inventors: Ahmad El Assaad, Wolfsburg (DE); Guillaume Jornod, Berlin (DE); Steffen Schmitz, Wesel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 595 days.

(21) Appl. No.: 16/410,681

(22) Filed: May 13, 2019

(65) Prior Publication Data
US 2019/0357051 A1    Nov. 21, 2019

(30) Foreign Application Priority Data
May 15, 2018   (EP) .................................... 18172216

(51) Int. Cl.
*H04W 12/08*    (2021.01)
*H04W 12/06*    (2021.01)
(Continued)

(52) U.S. Cl.
CPC ......... *H04W 12/106* (2021.01); *G01S 5/0226* (2013.01); *G01S 5/0236* (2013.01);
(Continued)

(58) Field of Classification Search
CPC ... H04W 12/106; H04W 4/46; H04W 12/009; H04W 12/06; H04W 12/79; H04W 4/40;
(Continued)

(56) References Cited

U.S. PATENT DOCUMENTS

| 10,621,868 B2 | 4/2020 | Naserian et al. |
| 2004/0252050 A1 | 12/2004 | Tengler et al. .......... 342/357.31 |

(Continued)

FOREIGN PATENT DOCUMENTS

| CN | 106162521 A | 11/2016 | ............ H04W 12/00 |
| EP | 2696615 A1 | 2/2014 | ............ H04L 29/06 |
| WO | WO-2020086127 A1 * | 4/2020 | ............ B60K 35/00 |

OTHER PUBLICATIONS

Amr Abdelaziz; Ron Burton; Frank Barickman; John Martin; Josh Weston; Can Emre Koksal; "Enhanced Authentication Based on Angle of Signal Arrivals"; IEEE Transactions on Vehicular Technology; May 2019; vol. 68; Publisher: IEEE; pp. 4602-4614 (Year: 2019).*

(Continued)

*Primary Examiner* — Shewaye Gelagay
*Assistant Examiner* — Courtney D Fields
(74) *Attorney, Agent, or Firm* — Slayden Grubert Beard PLLC

(57) ABSTRACT

Embodiments relate to a method, an apparatus, a vehicle and a computer program for determining information related to an authenticity of a wireless message in a wireless group communication among vehicles of a group of vehicles. The method comprises Receiving the wireless message via an antenna module. The method further comprises Detecting a signal pilot within the wireless message. The method further comprises Determining the information related to the authenticity of the wireless message based on the detected signal pilot.

17 Claims, 4 Drawing Sheets

(51) Int. Cl.
    *H04W 64/00*    (2009.01)
    *H04L 29/06*    (2006.01)
    *G06F 15/16*    (2006.01)
    *H04W 12/106*   (2021.01)
    *H04W 4/46*     (2018.01)
    *H04W 12/00*    (2021.01)
    *G01S 5/02*     (2010.01)

(52) U.S. Cl.
    CPC ........... *H04W 4/46* (2018.02); *H04W 12/009* (2019.01); *H04W 12/06* (2013.01)

(58) Field of Classification Search
    CPC ... H04W 12/12; H04W 12/121; G01S 5/0226; G01S 5/0236; G01S 5/08; G01S 3/42; G08G 1/22; H04B 7/086; H04L 63/0876
    See application file for complete search history.

(56) References Cited

U.S. PATENT DOCUMENTS

| | | | |
|---|---|---|---|
| 2007/0032245 A1 | 2/2007 | Alapuranen | ............... 455/456.1 |
| 2016/0103199 A1* | 4/2016 | Rappaport | ............... G01S 3/42 |
| | | | 342/377 |
| 2016/0335897 A1* | 11/2016 | Naserian | ............... H04W 4/46 |
| 2017/0079051 A1* | 3/2017 | Sihlbom | ............ H04L 25/0226 |

OTHER PUBLICATIONS

Extended European Search Report, Application No. 18172216.6, 7 pages, dated Sep. 10, 2018.
Chinese Office Action, Application No. 201910401359.2, 21 pages, dated Jan. 30, 2022.

\* cited by examiner

APPARATUS, METHOD AND COMPUTER PROGRAM FOR DETERMINING INFORMATION RELATED TO AN AUTHENTICITY OF A WIRELESS MESSAGE IN A WIRELESS GROUP COMMUNICATION AMONG VEHICLES OF A GROUP OF VEHICLES

CROSS-REFERENCE TO RELATED APPLICATIONS

This application claims priority to European Patent Application EP 18172216.6, filed on May 15, 2018 with the European Patent Office. The contents of this application are incorporated herein for all purposes.

TECHNICAL FIELD

The present invention relates to an apparatus, a method and a computer program for determining information related to an authenticity of a wireless message in a wireless group communication among vehicles of a group of vehicles, more particularly, but not exclusively to a concept for verifying the authenticity of wireless messages based on a signal pilot of the wireless message.

BACKGROUND

The coordinated driving of a group of vehicles (platooning) is a field of research and development. To coordinate the vehicle, in many systems, direct vehicle-to-vehicle messages are used. Using such direct messages, a velocity and/or a direction of driving of the vehicles of the group of vehicles can be coordinated. Such direct messages are often based on a Vehicle-to-Vehicle (V2V), or more general, Vehicle-to-X (V2X) communication protocol. One of the wireless transmission standards backing V2X communication is based on IEEE (Institute of Electrical and Electronics Engineers) standard 802.11p.

SUMMARY

When communicating within a platoon of vehicles, it may be important to verify that control and/or status messages assumed to be received from other vehicles of the platoon have actually been transmitted by these vehicles.

An object may thus exist for a communication concept among vehicles of a group of vehicles, in which an authenticity of received messages is verified.

The object is solved by the subject matter of the independent claims. The dependent claims and the following description discuss various non-limiting embodiments.

DETAILED DESCRIPTION

Figure 1A:
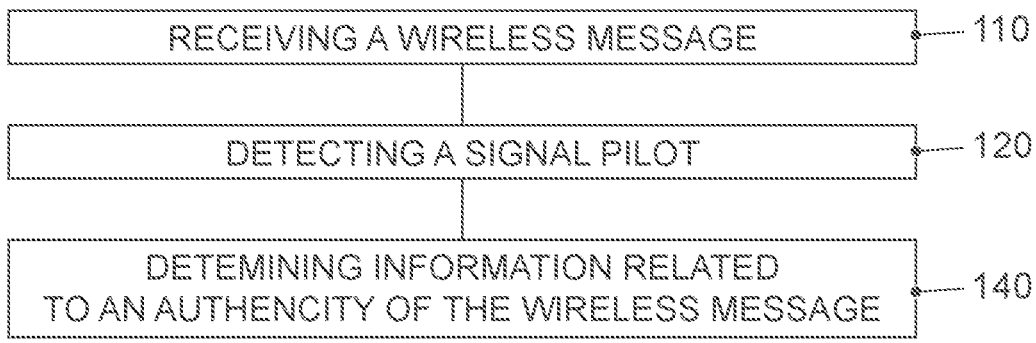
FIGS. 1a and 1b illustrate flow charts of embodiments of a method for determining information related to an authenticity of a wireless message in a wireless group communication among vehicles of a group of vehicles

Embodiments are based on the finding that signal pilots can be used to verify the authenticity of wireless messages. By using a limited set of "valid" and authorized signal pilots among vehicles of the group of vehicles, malicious actors, which may not know the limited set of "valid" and authorized signal pilots, can be recognized and their respective messages discarded. If a malicious actor has knowledge of the limited set of valid and authorized signal pilots, the signal pilots can be used to determine an angle of arrival of the wireless messages. If a wireless message arrives from a direction, from which a malicious actor is more likely to transmit than a vehicle of the group of vehicles, the wireless message may be discarded as well.

Embodiments provide a method for determining information related to an authenticity of a wireless message in a wireless group communication among vehicles of a group of vehicles. The group of vehicles may form a platoon of vehicles. The method may comprise receiving the wireless message via an antenna module. The method may further comprise detecting a signal pilot within the wireless message. The method may further comprise determining the information related to the authenticity of the wireless message based on the detected signal pilot. The information related to the authenticity of the wireless message may indicate, whether the wireless message is assumed to be received from a vehicle of the group of vehicles. In at least some embodiments, the wireless message is determined to be inauthentic if the detected signal pilot is an unauthorized signal pilot. The wireless message may be determined to be inauthentic if the detected signal pilot is an invalid signal pilot. In some embodiments, the wireless message may be determined to be inauthentic if no signal pilot is detected within the wireless message. Using the signal pilot to determine the authenticity of the wireless message may enable the vehicles of the group of vehicles to discard messages that are sent by a malicious actor.

In various embodiments, the signal pilot is used as reference signal for a cross-correlation analysis in the detection of the signal pilot. This may enable an efficient detection of the signal pilot, e.g., across a plurality of signal components of a phased array antenna.

In at least some embodiments, the signal pilot is detected based on a spatial filtering of the wireless message. Spatially filtering the wireless message may enable separating incoming wireless messages from multiple transmitters, and may enable discarding wireless messages received from angles from where vehicles of the group of vehicles are unlikely to have sent an authentic wireless message.

In some embodiments, the method further comprises determining information related to a direction of arrival for the wireless message based on the signal pilot and based on the spatial filtering of the wireless message. The information related to the authenticity of the wireless message may be determined based on the information related to the direction of arrival for the wireless message. Determining the direction of arrival, e.g., the angle of arrival for the wireless message may enable a determination, whether the wireless message was sent from one of the vehicles of the group of vehicles. Furthermore, wireless messages of malicious actors located at the side of the road may be detected and discarded.

In some embodiments, the method further comprises receiving a plurality of signal pilots from the group of vehicles. The method may further comprise determining information related to an estimated position of the vehicles of the group of vehicles based on the received plurality of signal pilots. The determining of the information related to the authenticity of the wireless message may be further based on the information related to the estimated position of the vehicles of the group of vehicles. The wireless message may be determined to be authentic, if the detection of arrival corresponds to the estimated position of the vehicles of the group of vehicles. If the position of the vehicles of the group of vehicles are known, (only) messages from these positions might be determined to be authentic.

In some embodiments, the antenna module comprises a phased array antenna. The detecting of the signal pilot within the wireless message may comprise performing a cross-correlation analysis on signal components received via the phased array antenna. In other words, the determining of the information related to the direction of arrival for the wireless message may comprise beam pointing the direction of arrival for the wireless message based on the detected signal pilot using the signal components received via the phased array antenna. Using a phased array antenna, the signal pilots may be used as a basis for comparison while the different angles of arrival available via the phased array antenna are analyzed.

In various embodiments, the determining of the information related to the authenticity of the wireless message is further based on information related to a vehicle position of a vehicle of the group of vehicles relative to a road structure. The wireless message may be determined to be inauthentic if the direction of arrival for the wireless message and the vehicle position of the vehicle relative to the road structure indicate that the message was sent from outside the road structure. Alternatively or additionally, the wireless message may be determined to be inauthentic if the direction of arrival for the wireless message and the vehicle position of the vehicle relative to the road structure indicate that the message was sent from a position on the road structure not used by the group of vehicles.

In some embodiments, the method further comprises determining information related to a signal strength of the received wireless message. The determining of the information related to the authenticity of the wireless message may further be based on the information related to the signal strength of the received wireless message. Using the signal strength may enable a more precise distinguishing between authentic and inauthentic wireless messages.

In various embodiments, the method further comprises discarding the wireless message if the wireless message is determined to be inauthentic. If an inauthentic message is discarded/ignored, the communication among the group of vehicles might not be interrupted by messages from malicious actors.

Embodiments further provide a computer program having a program code for performing the method, when the computer program is executed on a computer, a processor, or a programmable hardware component.

Embodiments further provide an apparatus for determining information related to an authenticity of a wireless message in a wireless group communication among vehicles of a group of vehicles. The apparatus comprises an antenna module and a wireless communication module. The apparatus further comprise a control module configured to control the wireless communication module. The control module is further configured to receive the wireless message via the wireless communication module and via the antenna module. The control module is further configured to detect a signal pilot within the wireless message. The control module is further configured to determine the information related to the authenticity of the wireless message based on the detected signal pilot.

Embodiments further provide a vehicle comprising the apparatus.

Various example embodiments, features, and aspects are described more fully with reference to the accompanying drawings in which some example embodiments are illustrated. In the FIGS., the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present.

Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
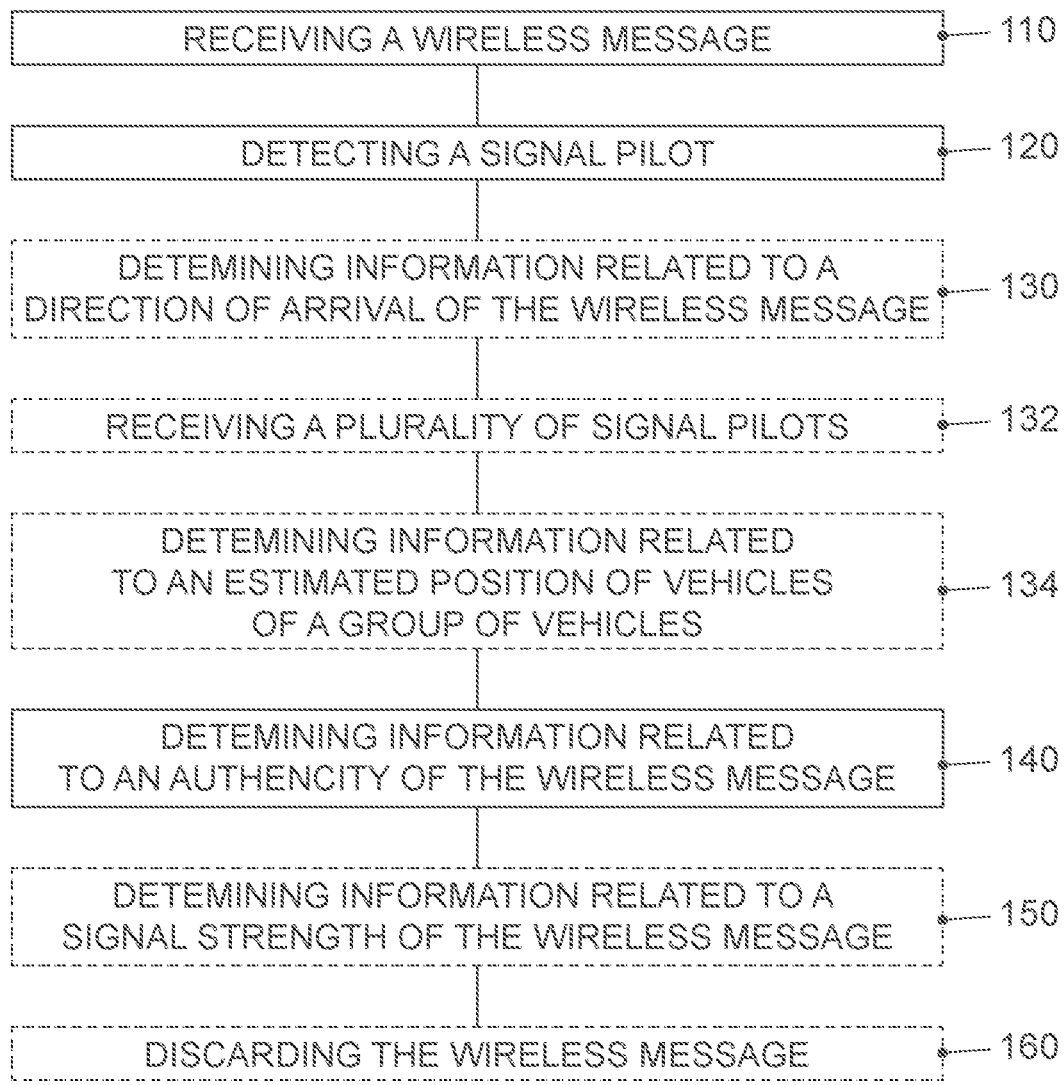

FIGS. 1a and 1b show flow charts of embodiments of a method for determining information related to an authenticity of a wireless message in a wireless group communication among vehicles of a group of vehicles. The method comprises receiving 110 the wireless message via an antenna module. The method further comprises detecting 120 a signal pilot within the wireless message. The method further comprises determining 140 the information related to the authenticity of the wireless message based on the detected signal pilot.

Figure 2:
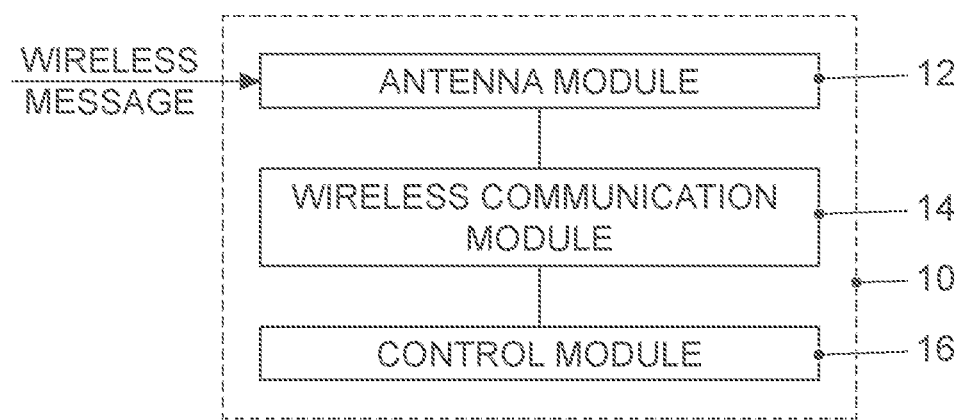
FIG. 2 illustrates a block diagram of an embodiment of an apparatus for determining information related to an authenticity of a wireless message in a wireless group communication among vehicles of a group of vehicles.

FIG. 2 shows a block diagram of an embodiment of a corresponding apparatus 10 for determining information related to an authenticity of a wireless message in a wireless group communication among vehicles of a group of vehicles. The apparatus 10 comprises an antenna module 12 and a wireless communication module 14. The apparatus 10 further comprises a control module 16 configured to receive the wireless message via the wireless communication module 14 and via the antenna module. The control module 16 is further configured to detect the signal pilot within the wireless message. The control module 16 is further configured to determine the information related to the authenticity of the wireless message based on the detected signal pilot. If not specified otherwise, the method steps of the method of FIGS. 1a and 1b may be performed by the control module 16. FIG. 2 further shows a block diagram of an embodiment of as vehicle 100 comprising the apparatus 10.

The following description relates to both the method of FIGS. 1a and 1b and the apparatus of FIG. 2.

Grouping vehicles into platoons is a method of increasing the capacity of roads. Within a platoon, a group of vehicles may be coordinated to accelerate or break simultaneously, allowing for smaller distances between the vehicles. For example, the group of vehicles may form a platoon. Among the vehicles of the platoon (the group of vehicles), the wireless group communication may be used to coordinate the group of vehicles. The wireless group communication may comprise or consist of control messages related to coordinated driving within the group of vehicles. The vehicle and/or vehicles of the group of vehicles may be vehicles for transporting goods, e.g. a truck or a lorry. Alternatively, the vehicle and/or the group of vehicles may be (personal) automobiles. In some embodiments, the vehicle and/or vehicles of the group of vehicles may be autonomous vehicles or semi-autonomously driven vehicles. The vehicle and/or vehicles of the group of vehicles may be suitable or configured for driving in a platoon of vehicles. In some embodiments, the vehicle and/or the group of vehicles may be airplanes, helicopters or ships suitable or configured for moving in a platoon of airplanes, helicopters or ships. In some embodiments, the vehicle and/or vehicles of the group of vehicles may be configured to be steered in a coordinated driving configuration.

To enable a secure functioning of the platoon, wireless messages used within the group of vehicles may be protected, e.g., to reduce or avoid the loss of messages and/or to avoid interference in the group communication by a malicious actor. For example, the authenticity of a wireless message is to be determined, e.g. to determine, that the wireless message received is from the vehicle (of the group of vehicles) claiming to have sent the wireless message. The information related to the authenticity may indicate, whether the wireless message was received from a trusted source, e.g., a vehicle of the group of vehicles. In at least some embodiments, the information related to the authenticity of the wireless message indicates, whether the wireless message is assumed to be received from a vehicle of the group of vehicles.

In various embodiments, the receiving 110 of the wireless message may comprise receiving a signal comprising the wireless message via the antenna module 12. For example, the receiving 110 of the wireless message may comprise receiving a plurality of signal components of the wireless message via the antenna module, e.g., receiving a plurality of signal components via a phased array antenna of the antenna module. In some embodiments, the receiving 110 of the wireless message may comprise receiving a plurality of unweighted signal components of the wireless message. In some embodiments, the (unweighted) signal components of the wireless message may be put together based on the detected signal pilot, based on a determined 130 direction of arrival of the wireless message and/or after detecting 120 the signal pilot.

In various embodiments, the wireless message is a wireless message of the group communication among the group of vehicles. The wireless message may be based on a vehicular communication standard, e.g. based on IEEE (Institute of Electrical or Electronics Engineers) 802.11p. The wireless message may be a Car-to-Car (C2C), Car-to-X (C2X). Vehicle-to-Vehicle (V2V) or Vehicle-to-X (V2X) message. In at least some embodiments, the wireless message is a vehicular group communication control message. The wireless message may be transmitted based on a Frequency-division Multiple Access (FDMA) or Orthogonal Frequency-Division multiplexing (OFDM)-based wireless protocol. In some embodiments, the wireless message may be transmitted using a beam-forming signal transmission.

In at least some embodiments, the antenna module 12 may comprise one of more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. The antenna module 12 may comprise a phase array antenna, e.g. a circular array antenna and/or a roof antenna/an antenna suitable for a roof the vehicle. In some embodiments, antennas of the antenna module 12 may be arranged at different sides of the vehicle. For example, the antenna module 12 may comprise one or more elements of the group of a front-facing antenna, a back-facing antenna and a side-facing antenna. The directions (front facing, back facing, side facing) may be defined in relation to a direction of travel of the vehicle.

The wireless communication module 14 may be implemented as any means for wirelessly transceiving, i.e., receiving and/or transmitting etc., one or more wireless communication units, one or more wireless communication devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. In at least some embodiments, the wireless communication module is configured to communicate via a vehicular communication network, e.g. via a Car-to-Car (C2C), Car-to-X (C2X). Vehicle-to-Vehicle (V2V) or Vehicle-to-X (V2X) communication network. The wireless communication module 14 may be configured to communicate directly with other vehicles, i.e., without involving any base station transceiver, which is also referred to as Device-to-Device (D2D) communication. In some embodiments, the communication may be aided by a base station transceiver. In order to do so radio resources are used, e.g. frequency, time, code, and/or spatial resources, which may as well be used for wireless communication with a base station transceiver. The assignment of the radio resources may be controlled by the base station transceiver, i.e., the determination which resources are used for D2D and which are not, or the assignment of the radio resource is determined by the (vehicular) communication protocol, e.g. if the resources are not shared with a cellular communication network. In various embodiments, the wireless communication module 14 may be configured to communicate via a Frequency-division Multiple Access (FDMA) or Orthogonal Frequency-Division multiplexing (OFDM)-based wireless protocol.

In various embodiments, the signal pilot may be used to differentiate (or suitable for differentiating) between communication participants of the wireless communication among the group of vehicles. The signal pilot may be one of a plurality of signal pilots. The plurality of signal pilots may comprise a subset of signal pilots used or to be used by the group of vehicles. The subset of signal pilots may comprise the signal pilots of the plurality of signal pilots valid or authorized for wireless communication among the group of vehicles. The signal pilot may comprise or be a sender identification within the wireless group communication. The signal pilot may be associated with a vehicle of the group of vehicles (e.g., if it is valid and authorized). A signal pilot may comprise a sequence of signal states, a sequence of signal values (e.g., amplitude and/or phase), a sequence of bits, a bit vector etc. For example, a signal state may be a binary signal state or a higher order signal state, e.g., of a 64 or 256 value modulation system, e.g., based on a Phase-Shift-Keying (PSK) and/or based on an Amplitude-Shift-Keying (ASK) modulation scheme, for example Quadrature Amplitude Modulation (QAM). In various embodiments, the signal pilot is a preamble of the wireless message. In at least some embodiments, the plurality of signal pilots and/or the subset of signal pilots may be (mutually) orthogonal. The signal pilot may be based on a cryptographic function. For example, the signal pilot may be derived from a private key of a cryptographic key pair of the vehicle or of the group of vehicles.

The detecting 120 of the signal pilot may comprise searching for or identifying the signal pilot within the wireless message. In some embodiments, the wireless message may be scanned for signal pilots of the subset of signal pilots (e.g., for the signal pilot), e.g. based on a cross-correlation/autocorrelation analysis based on the signal pilot. Alternatively, other pattern detection algorithms may be used to detect 120 the signal pilot.

In at least some embodiments, detecting 120 the signal pilot may comprise performing a cross-correlation (or auto-correlation) analysis of the received wireless message against the signal pilot or against a transformation of the signal pilot. The signal pilot or a transformation of the signal pilot may be used as reference signal in a cross-correlation/autocorrelation analysis of the wireless message.

In various embodiments, the detecting 120 of the signal pilot may comprise performing a cross-correlation (or auto-correlation) analysis on one or more signal components (or combinations of signal components) of the received wireless message against the signal pilot or against a transformation of the signal pilot. The signal pilot may be detected 120 based on a spatial filtering of the wireless message. The detecting 120 of the signal pilot may comprise determining a plurality of combinations of signal components of the wireless message to spatially filter the wireless message, e.g., based on a characteristic of a phased array antenna of the antenna module 12. The detecting 120 of the signal pilot may comprise (spatially) sweeping the plurality of combinations of signal components of the wireless message. The Detecting 120 of the signal pilot within the wireless message may comprises performing a cross-correlation analysis on signal components received via the phased array antenna. In some embodiments, the spatial filtering may be limited to a range of angles authentic wireless messages are expected to be received from. In at least some embodiments, the range of angles may be based on the estimated position of the vehicles of the group of vehicles. Alternatively or additionally, the range of angles may (only) deviate up to ±15° or ±20° from a line intersecting the vehicle from front to back (or back to front). In some embodiments, the range of angles may cover substantially an area in front and behind the vehicle, e.g., without deviating more than 15° or more than 20° to the sides. In some embodiments, the range of angles may (only) comprise or contain angles intersecting a height above ground, at which antenna modules of other vehicles of the group of vehicles are located. The signal pilot may be deemed detected within a combination of the plurality of signal components of the wireless message if a result of the cross-correlation analysis of the signal component against the signal pilot is above a threshold.

For example, the determining 140 of the information related to the authenticity of the wireless message may comprise determining, whether the wireless message is deemed to be authentic, e.g., whether the wireless message is (deemed to be) transmitted by a vehicle of the group of vehicles. The determining 140 of the information related to the authenticity may determine whether the wireless message can be trusted. The wireless message may be (deemed) authentic, if it was sent from a vehicle of the group of vehicles, e.g., from a vehicle of the group of vehicles indicated or identified by the signal pilot. The wireless message may be (deemed) inauthentic, if it was not sent from a vehicle of the group of vehicles, e.g., from a malicious vehicle or a malicious stationary actor. The wireless message may be determined 140 to be inauthentic if the detected signal pilot is an unauthorized signal pilot. For example, a signal pilot may be unauthorized if it is not a signal pilot used among the group of vehicles. Additionally or alternatively, the wireless message may be determined 140 to be inauthentic if the detected signal pilot is an invalid signal pilot. A signal pilot may be invalid, if it is not a valid signal pilot, e.g., if it is not comprised in the plurality of signal pilots. For example, the plurality of signal pilots may be defined for a communication standard used in the group communication. Alternatively, the plurality of signal pilots may be defined for or by a manufacturer or operator of groups of vehicles (platoons).

In some embodiments, a signal pilot may be invalid, if it is not derived from a cryptographic secret known or specific to the group of vehicles. In embodiments, the wireless message may be determined 140 to be inauthentic if no signal pilot is detected 120 within the wireless message. As shown in FIG. 1b, the method may further comprise discarding 160 the wireless message, if the wireless message is determined 140 to be inauthentic.

In some embodiments, as further shown in FIG. 1b, the method further comprises determining 130 information related to a direction of arrival (e.g. angle of arrival) for the wireless message based on the signal pilot and based on the spatial filtering of the wireless message. For example, the determining 130 of the information related to the direction of arrival for the wireless message may comprise beam pointing the direction of arrival for the wireless message based on the detected signal pilot using the signal components received via the phased array antenna, e.g., based on the spatial filtering of the wireless message. The direction of arrival may be determined 130 based on the combination of signal components of the wireless message, for which the result of the cross-correlation/autocorrelation analysis between the combination of signal components and the signal pilot (or transformation of the signal pilot) is highest. In various embodiments, the determining 130 of the information related to the direction of arrival may comprise determining or estimating the direction of arrival of the wireless message (e.g., where the wireless message was transmitted from). In at least some embodiments, the determining 130 of the information related to the direction of arrival is based on the MUSIC (Multiple Signal Classification) and/or based on the ESPRIT (Estimation of Signal Parameters via Rotational Invariance Technique) algorithm.

The determining 130 of the information related to the direction of arrival may be limited to a range of angles authentic wireless messages are expected to be received from. In at least some embodiments, the range of angles may be based on the estimated position of the vehicles of the group of vehicles. Alternatively or additionally, the range of angles may (only) deviate up to ±15° or ±20° from a line intersecting the vehicle from front to back (or back to front). In some embodiments, the range of angles may cover substantially an area in front and behind the vehicle, e.g., without deviating more than 15° or more than 20° to the sides. In some embodiments, the range of angles may (only) comprise or contain angles intersecting a height above ground, at which antenna modules of other vehicles of the group of vehicles are located.

The information related to the authenticity of the wireless message may be determined 140 based on the information related to the direction of arrival for the wireless message. Wireless messages received from outside the range of angles may be determined 140 to be inauthentic.

In some embodiments, as further shown in FIG. 1b, the method further comprises receiving 132 a plurality of signal pilots (e.g., within a plurality of wireless messages) from the group of vehicles. For example, the plurality of signal pilots may be comprised in a plurality of periodically received wireless messages from the group of vehicles. The method may further comprise determining 134 information related to an estimated position of the vehicles of the group of vehicles based on the received plurality of signal pilots. For example, the method may further comprise determining 134 an estimated position for each of the vehicles of the group of vehicles. The information related to the estimated position may comprise information related to an estimated position for each of the vehicles relative to the vehicle (e.g., the relative to the vehicle receiving the plurality of signal pilots). An estimated position of a vehicle of the group of vehicles may correspond to a position of the vehicle as can be deduced based on the wireless signal pilot. The estimated position of a vehicle may be relative to a position of the vehicle performing the method. The estimated position of a vehicle may comprise a perimeter around a position of said vehicle determined 134 based on a signal pilot received 132 from said vehicle. In the determining 134 of the information related to the estimated position(s) of the vehicles, the plurality of signal pilots may be used to identify and/or distinguish the vehicles of the group of vehicles. The information related to the estimated position(s) of the vehicles may be determined based on a direction of arrival of the plurality of signal pilots (e.g., of the plurality of wireless messages comprising the plurality of signal pilots). Alternatively or additionally, the plurality of wireless messages may comprise positional information related to the vehicles of the group of vehicles, e.g., information related to an absolute position for each vehicle, a velocity for each vehicle or a motion vector for each vehicle. The determining 134 of the information related to the estimated position of the vehicles may be based on positional information of a vehicle performing the method and based on the positional information related to the vehicles of the group of vehicles. The determining 140 of the information related to the authenticity of the wireless message may be further based on the information related to the estimated position of the vehicles of the group of vehicles. The wireless message may be determined 140 to be authentic, if the detection of arrival corresponds to the estimated position of the vehicles of the group of vehicles. The wireless message may be determined 140 to be authentic, if the detection of arrival corresponds to the estimated position of the vehicles of the group of vehicles. For example, the wireless message may be determined 140 to be authentic, if the detection of arrival corresponds to a perimeter around the estimated position of the vehicles of the group of vehicles. In some embodiments, the method may further comprise determining information related to an expected angle of arrival based on the information related to the estimated position of the vehicle. The wireless message may be determined to be authentic, (only) if the determined 130 angle of arrival differs by less than a threshold from the expected angle of arrival (e.g. for an estimated position of a vehicle associated with the signal pilot of the wireless message). For example, the wireless message may be determined 140 to be authentic, if the detection of arrival corresponds to the estimated position of a vehicle of the group of vehicles, wherein said vehicle uses or is identified by the signal pilot of the wireless message.

Alternatively or additionally, the determining 140 of the information related to the authenticity of the wireless message is further based on information related to a vehicle position of a vehicle of the group of vehicles relative to a road structure. The road structure may be a street or highway the vehicle (e.g., the vehicle performing the method) is currently travelling on, e.g., a portion of the street or the highway used by vehicles travelling in the same direction as the vehicle. For example, the wireless message may be determined 140 to be inauthentic if the direction of arrival for the wireless message and the vehicle position of the vehicle relative to the road structure indicate that the message was sent from outside the road structure. For example, the wireless message may be determined 140 to be inauthentic if the direction of arrival for the wireless message and the vehicle position of the vehicle relative to the road structure indicate that the wireless message cannot have been sent by a vehicle travelling in the same direction as the vehicle (e.g., the vehicle performing the method).

In some embodiments, as further shown in FIG. 1b, the method further comprises determining 150 information related to a signal strength of the received wireless message. The determining 140 of the information related to the authenticity of the wireless message may be further based on the information related to the signal strength of the received wireless message. For example, the method may further comprise filtering out reflected portions of the wireless message based on the information related to the signal strength. Additionally or alternatively, the method may further comprise determining 140 a wireless message to be inauthentic, if the signal strength does not correspond to the estimated positions of the vehicles of the group of vehicles. For example, if the signal strength of the received wireless message is too high, or if the signal strength shows a Doppler pattern, the wireless message may be determined to be inauthentic.

As shown in FIG. 2, the wireless communication module 14 is coupled to the control module 16 and to the antenna module 12. In embodiments the control module 16 may be implemented using one or more processing units, one or more processing devices, any means for processing, such as a processor, a computer or a programmable hardware component being operable with accordingly adapted software. In other words, the described functions of the control module 16 may as well be implemented in software, which is then executed on one or more programmable hardware components. Such hardware components may comprise a general-purpose processor, a Digital Signal Processor (DSP), a micro-controller, etc.

More details and aspects of the method and the apparatus 10 are mentioned in connection with the proposed concept or one or more examples described above or below (FIGS. 3 to 6). The method and/or the apparatus 10 may comprise one or more additional optional features corresponding to one or more aspects of the proposed concept or one or more examples described above or below.

Figure 3:
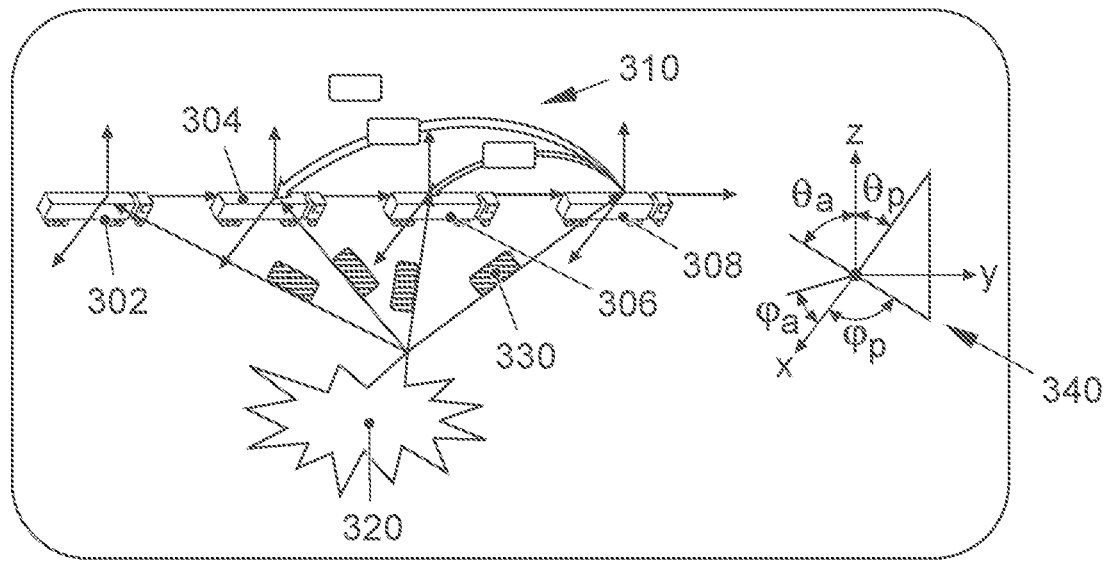
FIG. 3 illustrates a schematic drawing of an attack scenario, in which an attacker transmits malicious messages having a wrong angle of arrival and wrong signal pilots.

At least some embodiment relate to V2X security in platooning. In platooning (coordinated driving of a group of vehicles), it may be crucial to have a secure communication between trucks since safety critical information are exchanged between members. The transmission of malicious messages on the same frequency band deployed for platooning messaging is a typical attack method, which may lead the platoon into unstable state. The forged messages may interfere then with the platooning messages, which can lead to the distortion of platooning message at some receivers. FIG. 3 illustrates possible attack scenarios. FIG. 3 shows vehicles of the platoon (the group of vehicles) 302-308 communicating via wireless messages 310. An attacker 320 tries to interfere by sending wireless messages 330. FIG. 3 illustrates an attack from a wrong Angle Of Arrival (AOA, e.g. the direction of arrival) $((\vartheta_a,\varphi_a) \neq (\vartheta_p,\varphi_p))$ 340 and wrong platooning pilots. Diagram 340 shows a 3D-diagram of azimuth and elevation angels of messages received by vehicles of the platoon 302-308 and messages received by attacker 320. The indices "a" and "p" denote attacker 320 and vehicles of the platoon 302-308 respectively, $\vartheta$ denotes the elevation angle and $\varphi$ denotes the azimuth angle. In examples, the presented V2X security concept may assume dedicated pilots (e.g., the signal pilot) in the physical layer to be used in the platoon, which might be only known to the transceivers of platoon members.

Figure 4:
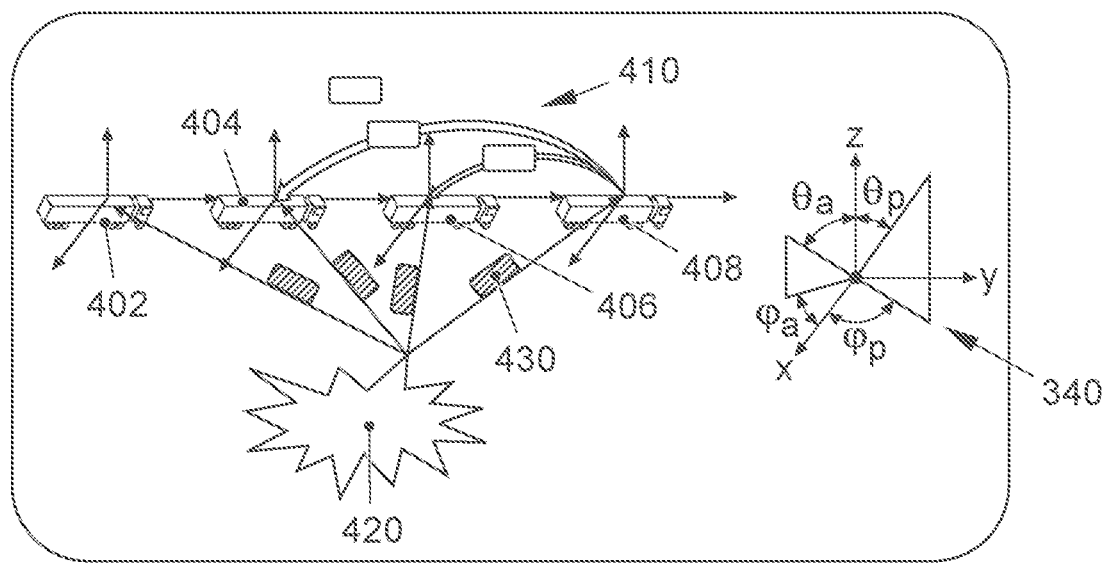
FIG. 4 illustrates a schematic drawing of an attack scenario, in which an attacker transmits malicious messages having a wrong angle of arrival and manipulated signal pilots.

FIG. 4 illustrates an attack from the wrong AOA $(\vartheta_a,\varphi_a) \neq (\vartheta_p,\varphi_p)$ 440 and manipulated platooning pilots. Diagram 340 shows a 3D-diagram of azimuth and elevation angels of messages received by vehicles of the platoon 402-408 and messages received by attacker 420. The indices "a" and "p" denote attacker 420 and vehicles of the platoon 402-408 respectively, $\vartheta$ denotes the elevation angle and $\varphi$ denotes the azimuth angle. FIG. 4 shows vehicles of the platoon (the group of vehicles) 402-408 communicating via wireless messages 410. An attacker 420 tries to interfere by sending wireless messages 430. It may be assumed that the positions of the trucks in the platoon are known at each platoon member.

Figure 5:
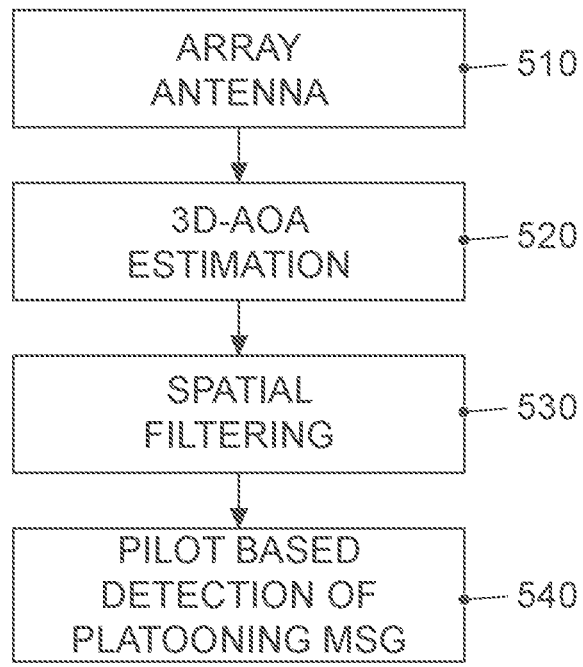
FIG. 5 illustrates a flow chart of an attack detection and extraction of platooning messages.

The attack of FIG. 3 may be detected using the scheme described in FIG. 5. FIG. 5 illustrates a flow chart of an attack detection and extraction of platooning messages. Embodiments may be based on using phased array antennas 510 with sufficient large aperture in the azimuth and elevation planes for accurate 3D-AOA (Angle of Arrival) estimation (e.g., the determining 130 of the information related to the direction of arrival of the wireless message). After the estimation of the 3D-AOA 520 (for example using MUSIC, Multiple Signal Classification or ESPRIT, Estimation of Signal Parameters via Rotational Invariance Technique, algorithms), it may be feasible to extract received signals with spatial filtering 530. With spatial filtering, it may be feasible to extract a baseband signal, which arrived with certain 3D-AOA at the phased array antenna. In other words, the received platooning signals and the attacking signals may be spatially separated after the 3D-AOA estimation. The detection of the platooning message 540 (e.g., the Detecting 120 of the signal pilot) may be carried out using a cross-correlation based detection method, which may use platooning specific pilots (e.g., the signal pilot) as reference signals in the cross-correlation operation. The cross-correlation may be maximized for the platooning message. The attacker baseband signals might not maximize the cross-correlation operation since they might not contain the platooning pilots (e.g., the signal pilot).

Figure 6:
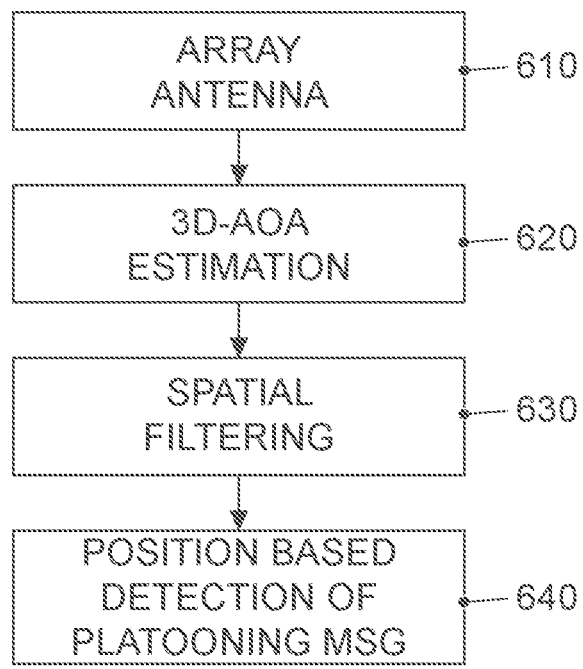
FIG. 6 illustrates a flow chart of a positioning based detection of platooning messages.

FIG. 6 illustrates a flow chart of a positioning based detection of platooning messages. In the attack type of FIG. 4, the attacker may be able to manipulate/forge the platooning pilots (e.g., the signal pilot) but still send from a position, from which the attacker signal arrives at the phased array antennas 610 (e.g., of the antenna module 12) of the platoon member from an unexpected 3D-AOA 620. After spatial filtering 630 is carried out, the position information may be extracted from the signal (e.g., by Determining 130 the information related to the direction of arrival of the wireless message) and a shall-value of 3D-AOA may be calculated (e.g., by determining 134 the information related to the estimated position of the vehicles of the group of vehicles). The shall-3D-AOA value may be compared to the observed 3D-AOA. If the difference between shall-value and observed value of 3D-AOA is larger then allowed (e.g., depends on the positioning accuracy and 3D-AOA estimation accuracy), the signal may be considered as an attacker signal (and determine 140 to be inauthentic), else it may be the wanted platooning signal 640.

An advantage of the presented methods is that they do not only detect an attack but may also be able to recover the platooning message and filter the attacker message out in the physical layer.

As already mentioned, in embodiments, the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim and/or further embodiments of the specification. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

10 Apparatus
12 Antenna module
14 Wireless communication module
16 Control module
100 Vehicle
110 Receiving a wireless message
120 Detecting a signal pilot
130 Determining information related to a direction of arrival for the wireless message
132 Receiving a plurality of signal pilots
134 Determining information related to an estimated position of vehicles of a group of vehicles
140 Determining information related to an authenticity of the wireless message
150 Determining information related to a signal strength of the wireless message
160 Discarding the wireless message

What is claimed is:

1. A method for determining authenticity of a wireless message in a wireless group communication among vehicles of a group of vehicles, the method comprising:
   receiving the wireless message via an antenna from another vehicle of the group of vehicles;
   detecting a signal pilot within the wireless message, wherein the signal pilot is detected based on spatial filtering of the wireless message;
   determining information related to a direction of arrival of the wireless message based on the signal pilot and based on the spatial filtering of the wireless message; and
   determining the authenticity of the wireless message based on the detected signal pilot by comparing the detected signal pilot with a limited set of authorized signal pilots and by using the direction of arrival of the wireless message, wherein both, comparing the detected signal pilot with a limited set of authorized signal pilots and the direction of arrival is used to distinguish between authentic and inauthentic wireless messages;
   wherein the wireless message is determined to be authentic if the detection of arrival corresponds to the estimated position of the vehicles of the group of vehicles.

2. The method according to claim 1, wherein the wireless message is determined to be inauthentic if the detected signal pilot is an unauthorized signal pilot.

3. The method according to claim 1, wherein the information related to the authenticity of the wireless message indicates whether the wireless message is assumed to be received from a vehicle of the group of vehicles.

4. The method according to claim 1, wherein the signal pilot is used as reference signal for a cross-correlation analysis in the detection of the signal pilot.

5. The method according to claim 1, further comprising receiving a plurality of signal pilots from the group of vehicles; and
   determining information related to an estimated position of the vehicles of the group of vehicles based on the received plurality of signal pilots;
   wherein the determining of the information related to the authenticity of the wireless message is further based on the information related to the estimated position of the vehicles of the group of vehicles.

6. The method according to claim 1, wherein the antenna comprises a phased array antenna and wherein the detecting of the signal pilot within the wireless message comprises performing a cross-correlation analysis on signal components received via the phased array antenna.

7. The method according to claim 1, wherein the determining of the information related to the authenticity of the wireless message is further based on information related to a vehicle position of a vehicle of the group of vehicles relative to a road structure.

8. The method according to claim 7, wherein the wireless message is determined to be inauthentic if the direction of arrival for the wireless message and the vehicle position of the vehicle relative to the road structure indicate that the message was sent from outside the road structure.

9. The method according to claim 1, further comprising determining information related to a signal strength of the received wireless message; wherein the determining of the information related to the authenticity of the wireless message is further based on the information related to the signal strength of the received wireless message.

10. A non-transitory medium having program code, which program code when executed on a computer, a processor, or a programmable hardware component, causes the computer, processor, or programmable hardware component to:
   receive a wireless message via an antenna from another vehicle of a group of vehicles;
   detect a signal pilot within the wireless message, wherein the signal pilot is detected based on spatial filtering of the wireless message;
   determine information related to a direction of arrival of the wireless message based on the signal pilot and based on the spatial filtering of the wireless message; and
   determine authenticity of the wireless message based on the detected signal pilot by comparing the detected signal pilot with a limited set of authorized signal pilots and by using the direction of arrival for the wireless message, wherein both, comparing the detected signal pilot with a limited set of authorized signal pilots and the direction of arrival is used to distinguish between authentic and inauthentic wireless messages;
   wherein the wireless message is determined to be authentic if the detection of arrival corresponds to the estimated position of the vehicles of the group of vehicles.

11. Apparatus for determining information related to an authenticity of a wireless message in a wireless group communication among vehicles of a group of vehicles, the apparatus comprising:
   an antenna;
   a wireless communication transceiver; and
   a controller configured to:
      receive the wireless message from another vehicle of the group of vehicles via the wireless communication transceiver and via the antenna,
      detect a signal pilot within the wireless message, wherein the signal pilot is detected based on spatial filtering of the wireless message,
      determine information related to a direction of arrival of the wireless message based on the signal pilot and based on the spatial filtering of the wireless message, and
      determine the authenticity of the wireless message based on the detected signal pilot by comparing the detected signal pilot with a limited set of authorized signal pilots and by using the direction of arrival of the wireless message, wherein both, comparing the detected signal pilot with a limited set of authorized signal pilots and the direction of arrival is used to distinguish between authentic and inauthentic wireless messages;
      wherein the wireless message is determined to be authentic if the detection of arrival corresponds to the estimated position of the vehicles of the group of vehicles.

12. A vehicle, configured for determining an authenticity of a wireless message in a wireless group communication among vehicles of a group of vehicles, the vehicle comprising:
   an antenna;
   a wireless communication transceiver; and
   a controller configured to:
      receive the wireless message from another vehicle of the group of vehicles via the wireless communication transceiver and via the antenna,
      detect a signal pilot within the wireless message, wherein the signal pilot is detected based on spatial filtering of the wireless message,
      determine information related to a direction of arrival of the wireless message based on the signal pilot and based on the spatial filtering of the wireless message, and
      determine the information related to the authenticity of the wireless message based on the detected signal pilot by comparing the detected signal pilot with a limited set of authorized signal pilots and by using the direction of arrival of the wireless message, wherein both, comparing the detected signal pilot with a limited set of authorized signal pilots and the direction of arrival is used to distinguish between authentic and inauthentic wireless messages;
   wherein the wireless message is determined to be authentic if the detection of arrival corresponds to the estimated position of the vehicles of the group of vehicles.

13. The method according to claim 1, wherein the group of vehicles forms a platoon of vehicles.

14. The method according to claim 1, wherein the wireless message is determined to be inauthentic if the detected signal pilot is an invalid signal pilot.

15. The method according to claim 1, wherein the wireless message is determined to be inauthentic if no signal pilot is detected within the wireless message.

16. The method according to claim 1, wherein the antenna comprises a phased array antenna and wherein the determining of the information related to the direction of arrival for the wireless message comprises beam pointing the direction of arrival for the wireless message based on the detected signal pilot using the signal components received via the phased array antenna.

17. The method according to claim 1, wherein the information related to the authenticity of the wireless message indicates, whether the wireless message was received from a trusted source.

* * * * *